Feb. 18, 1947.                C. DEPEW ET AL                 2,415,816
                           IONIC DISCHARGE DEVICE
                           Filed Sept. 8, 1943            2 Sheets-Sheet 1
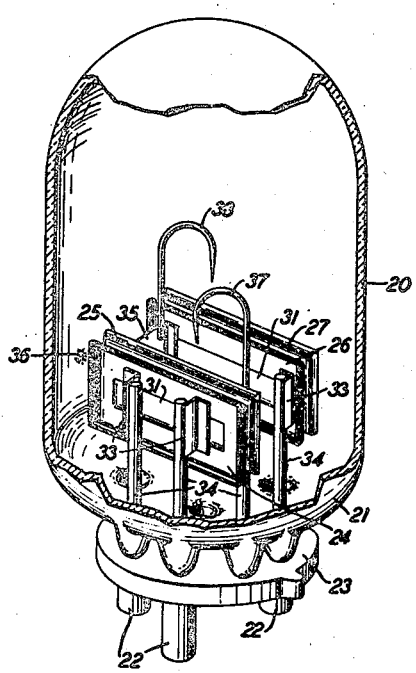
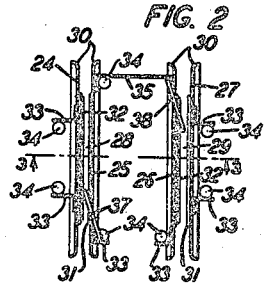
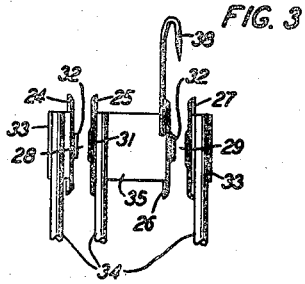
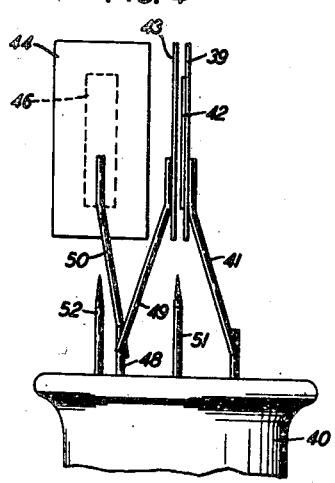
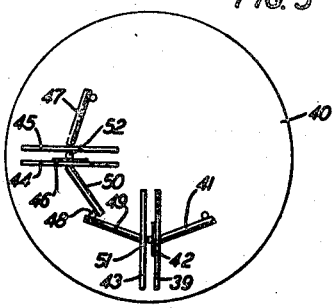
INVENTORS: C. DEPEW
W. A. DEPP
J. R. HAYNES
A. N. LUCE
BY Walter C. Kiesel
ATTORNEY Feb. 18, 1947.   C. DEPEW ET AL   2,415,816
IONIC DISCHARGE DEVICE
Filed Sept. 8, 1943   2 Sheets-Sheet 2
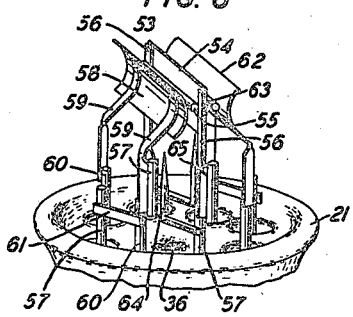
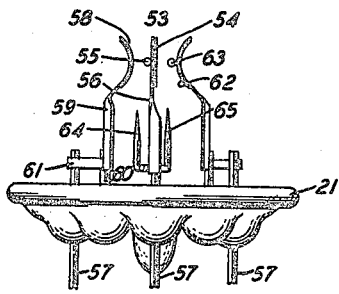
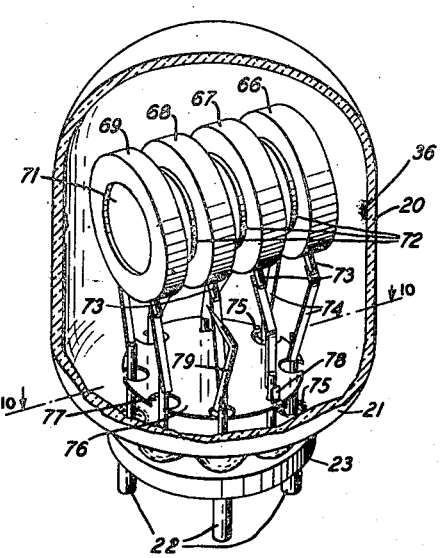
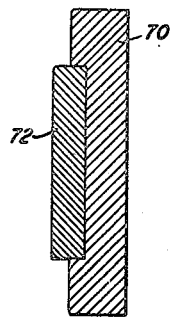
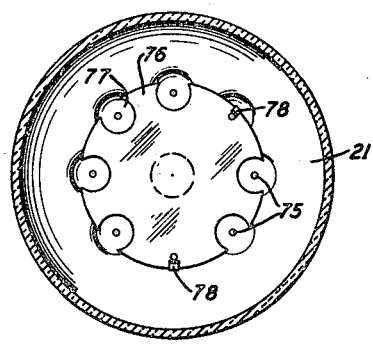
INVENTORS: C. DEPEW
W. A. DEPP
J. R. HAYNES
A. N. LUCE
BY Walter C. Kiesel
ATTORNEY Patented Feb. 18, 1947

2,415,816

UNITED STATES PATENT OFFICE 2,415,816

IONIC DISCHARGE DEVICE

Charles Depew, Oakland, N. J., and Wallace A. Depp, Elmhurst, and Alfred N. Luce, Port Washington, N. Y., and James R. Haynes, Chatham, N. J., assignors to Bell Telephone Laboratories, Incorporated, New York, N. Y., a corporation of New York Application September 8, 1943, Serial No. 501,530

18 Claims. (Cl. 250—27.5)

This invention relates to ionic discharge devices and more particularly to spark discharge devices operating at high voltage levels and having a stable uniform pulsing periodicity of discharge.

The principal object of the invention is to obtain a long operating life for spark pulsing devices functioning at high current levels.

A specific object of the invention is to facilitate the stability of the sparking discharge with a minimum of sputtering of the electrodes.

These objects are attained in accordance with the general aspects of this invention by the provision of a multiplicity of sparking gaps in a gaseous environment at a pressure more or less than atmospheric wherein the individual gaps are triggered or fired with a minimum of ionization lag and are deionized quickly to attain a high periodicity of discharge capable of being utilized for pulse modulation in high frequency signaling systems.

In accordance with specific embodiments of the invention an evacuated vessel containing a gaseous mixture substantially at atmospheric pressure encloses an assembly of electrodes which are correlated to establish multiple spark gaps for the generation of pulses of high periodicity and large power output for utilization in high frequency signal transmission systems.

In one arrangement the electrodes are rectangular metallic members mounted in parallel pairs in juxtaposed relation, each pair forming an individual gap for the spark discharge path, one electrode of each pair being an anode and the other a cathode. The cathode is provided with a central active surface of a metal highly resistant to gas occlusion and is positioned directly opposite a raised central portion of the anode to limit the discharge path to the minimum spacing distance between these electrodes. In the particular arrangement contemplated the outermost electrodes are the cathode and anode of separate pairs and the intermediate cathode and anode are in interface relation to the outermost electrodes, one being a cathode facing the anode and the other an anode facing a cathode. The intermediate electrodes are coupled together to form a composite cathanode element. The discharge gaps between the respective pairs of electrodes are initially ionized by the provision of a pair of corona points mounted uopn the cathanode and directed toward the multiple gaps between the electrodes.

The cathanode may be a single element interposed between a cathode and anode, one side of the single element serving as an anode for the cathode of one gap, while the other side functions as the cathode opposite the anode of the other gap. A feature of this construction is the formation of the outer electrodes as sections of a cylinder so that the center of the convex electrodes defines the minimum spark gap paths between the multiple electrodes.

Another embodiment of the invention comprises multiple discs arranged in parallel relation, the intermediate discs functioning as dual cathodes and anodes while the opposite end discs serve only as cathode and anode, respectively. Each disc is provided with a central recess and all of the discs except the terminal disc carries a metallic insert in the recess to form a cathode surface in opposed relation to the rear surface of an adjacent disc which functions as the anode, the anode surface and the adjacent insert surface forming a restricted discharge gap for the striking of a spark path therebetween. Initiation of ionization of the gap is enhanced by the provision of a corona point extending toward the gap and the breakdown of one gap immediately causes the remaining gaps to fire in order to carry the high voltage.

These arrangements not only attain practical importance from the standpoint of higher voltage application for the development of spark discharge generating devices, but also increase the operating efficiency thereof by the selective control of electrode sputtering by the choice of electrode materials and the electrode relationship. Furthermore, the cooperating electrodes of the multiple spark gap devices exhibit a sharp cut-off after breakdown of the gaps so that a large sparking current is attained and high periodicity of pulse frequency is assured.

These and other features and advantages of this invention will be more clearly set forth in the following detailed description which, together with the accompanying drawings, represent a complete disclosure of this invention.

Fig. 1 shows in perspective one embodiment of the invention with the vessel broken away to illustrate the assembly of electrodes constituting the multiple gaps for the generation of the spark discharge.

Fig. 2 is a plan view of the electrode assembly of Fig. 1 showing the relationship between the various electrodes and the establishment of the separate discharge gaps between the respective electrodes.

Fig. 3 shows a partial view of the electrode assembly in cross-section taken on the line 3—3 of Fig. 2.

Fig. 4 illustrates a modified form of the invention in elevation in which the separate gaps are perpendicular to each other.

Fig. 5 is a plan view of the structure shown in Fig. 4.

Fig. 6 is a perspective view of another form of the invention showing an electrode assembly involving a common intermediate element mounted on a stem, the enclosing vessel being removed.

Fig. 7 shows the same structure in a side elevation view to illustrate the configuration and association of the electrodes embodied in the device.

Fig. 8 illustrates in perspective a further modification of the invention in which the multiple spark gaps are provided by parallel disc electrodes.

Fig. 9 is a view in cross-section of one of the composite disc electrodes showing the detail assembly of the electrode, and Fig. 10 is a plan view of Fig. 8 taken on the line 10—10 to show the mounting of the protective shield between the electrodes and the stem.

Referring to Figs. 1, 2 and 3 of the drawings, a specific embodiment of the invention is shown which involves multiple spark gap discharge paths between closely spaced pairs of electrodes enclosed in a bulbous vessel or evacuated chamber 20 having a dished stem 21 forming a seal for the conductors of the electrodes, the conductors extending to three external terminals 22 supported on a disc base 23 adjacent the stem of the vessel. The electrode assembly of this invention comprises a plurality of pairs of closely spaced parallel cold electrodes 24, 25, 26 and 27 mounted in cooperating relation and defining separate spark discharge gaps 28 and 29 for the generation of high current pulsing energy of high frequency for signal transmission systems. Each electrode is formed of a rectangular-shaped metallic plate, such as molybdenum, to withstand the intense heat energy expanded in the discharge, the edges thereof being beveled, as shown at 30, to increase the rigidity of the plane surface of the plate in order to prevent warping and to maintain uniform parallel relation between the respective pairs of associated electrodes. Each electrode is also provided with a central elongated embossed portion 31, which defines the discharge area of the electrodes within the gap between each pair of electrodes to limit or concentrate the discharge to a definite path of controlled intensity. Alternate electrodes of the two pairs, such as 24 and 26, are provided with a superimposed layer or plate 32 of highly refractory metal, such as tungsten, mounted on the embossed central portion, to constitute the negative electrode or cathode surface in the discharge gap while the opposed embossed surface functions as the positive or anode surface of the discharge gap. The lateral space relation between the plate 32 and the raised surface 31 of the anode should be restricted to a limited path not materially greater than .1 inch although it is preferable to maintain the gap at a distance of .075 inch. The choice of electrode materials, their relationship and configuration together with the adherence to uniform spacing and the combination of gaseous constituents in the ionization media insure the production of a highly intense spark discharge with a minimum of sputtering of the cathode surface beyond the limited area of the discharge path. Another advantage of this construction is the preservation of continuous operation over a long period of life whereby high efficiency is attained. The electrodes are supported in uniform spaced relation by the provision of angle brackets 33 secured to the rear surfaces of the electrodes in position to be welded to a plurality of spaced conductors or supports 34 projecting from the dished stem 21 of the vessel.

The lateral electrodes of the assembly constitute a plurality of discharge gaps, the cathode 24 and the anode 25 forming one gap while the cathode 26 and the anode 27 form the remaining gap. The intermediate pair of electrodes 25 and 26 may be joined together by a strap 35 whereby these electrodes function as a common cathanode for the respective cathode 24 and anode 27 in the multiple spark discharge paths of the device. The electrode assembly is surrounded by a gaseous ionization medium consisting of a gas or a mixture of gases, such as argon, helium, hydrogen, nitrogen, carbon dioxide and oxygen, a desirable combination being argon and hydrogen or argon and oxygen. When oxygen is employed it is preferable to increase the volume of the enclosing vessel 20 to 200 cubic centimeters to insure the maintenance of sufficient oxygen in the mixture during a long operating life, the mixture of gases being of the order of argon 80 per cent, oxygen 20 per cent. If hydrogen or less absorbable inert gas is mixed with argon the vessel may be of a smaller size. The pressure of the gas or mixture of gases in the enclosing vessel may be from 20 centimeters to 5 atmospheres. A desirable pressure range for low voltage operation is from 50 to 76 centimeters of mercury and a more limited range should be between 60 and 67 centimeters. The addition of hydrogen and oxygen to the gaseous mixture reduces excessive sputtering of the electrodes in the spark discharge and tends to increase the triggering characteristics of the sparking path between the electrodes.

The initiation of conduction between the cold electrodes in the spark gaps is facilitated by the presence of ion-producing material within the vessel which may be provided by one or more spots of radium bromide or radium chloride paint 36 deposited on the side walls of the vessel adjacent the gaps between the electrodes to insure the presence of readily ionizable particles near the gaps of the electrodes. The ionization of the spark gaps is further enhanced by the provision of corona points 37 and 38 in the form of hook-shaped wires supported at opposite ends of the cathanode and arranged in such a manner to direct the pointed ends of the elements toward the center of the gaps between the respective pairs of electrodes. These facilities in association with the spark discharge gaps materially reduce the time lag of initial conduction in the gaps whereby high efficiency may be attained in the application of the device in pulse signaling systems of high frequency and high power output. In such systems the voltage across the spark discharge device is of a high order, such as a direct current voltage of from 1 to 25 kilovolts, operating over a pulsing repetition rate of from 100 to 4,000 pulses per second at a pulse length of .1 to 40 microseconds. The device of this invention facilitates pulsing periodicity under these exacting conditions with high efficiency to achieve a high stability of operation over a long period of operating life with a minimum of sputtering of the electrodes and the production of the pulsing discharge at high current levels of 5 to 1000 amperes and power output ratings from 1 kilowatt to 10,000 kilowatts.

A modification of the invention as shown in Fig. 1 is illustrated in Figs. 4 and 5 in which the discharge gaps are arranged at right angles to each other and the electrode assembly is more simplified to achieve the purposes of the invention. In this construction a rectangular plate 39 is mounted upright from the stem 40 by a wire brace 41 and is provided with a central juxtaposed plate 42 which is welded to the plate 39. A cooperating plate 43 is mounted in parallel relation to the plate 39 with a limited gap therebetween to form the discharge path between the cathode surface 42 and the anode surface 43. A similar pair of electrodes 44 and 45 are mounted in parallel relation at right angles to the plates 39 and 43, the electrode 44 being provided with a central juxtaposed active surface 46 to constitute the second gap in the device. The plate 45 is similarly supported from the stem by a brace wire 47 while the intermediate electrodes 43 and 44 are attached to a common conductor 48 by brace wires 49 and 50, respectively, so that the electrodes 44 and 43 constitute a common cathanode for the multiple discharge gaps in the device. In this embodiment the corona points 51 and 52 project vertically from the stem and are directed toward the respective gaps between the multiple electrodes.

A further modification of the invention is disclosed in Figs. 6 and 7 which primarily differs from the previously described forms in the unification of the cathanode element as a single composite electrode. Furthermore, the defining of the limited spark gap areas is accomplished in a different manner than heretofore explained. In this arrangement the central electrode or cathanode 53 is formed of a rectangular plate or sheet of molybdenum 54 and a molybdenum or tungsten rod 55 is welded lengthwise to one side of the sheet 54, the combined element being mounted in the axial plane of the stem 21 by stub wires 56 at opposite ends attached to a pair of conductors 57 in the stem. The plate 54 therefore serves as the anode of one gap while the rod 55 constitutes the cathode surface of the other gap. The cooperating electrodes associated with the cathanode 53 are laterally disposed on opposite sides of the common central element and are formed in such a manner that the discharge is concentrated to a definite area in the limited sparking gaps between the multiple electrodes. A rectangular anode plate 58 of molybdenum is formed into a section of a cylinder and disposed opposite the cathode surface of the cathanode 53. The plate 58 is supported by metallic straps 59 placed at opposite ends thereof and the straps are attached to anchor wires 60 in the stem, one of the wires being bridged by a strap 61 which is connected to a leading-in conductor 57 in the stem. A similar arcuate sheet metal electrode 62 is mounted opposite the anode surface of the cathanode 53 and is provided with a centrally welded cathode surface or rod 63 to establish the second discharge gap in the device. This electrode is supported in the stem in the same manner as described in connection with electrode 58.

The configuration of the outermost electrodes 58 and 62 in relation to the central cathanode 53 restricts the sparking discharge paths in the multiple gaps between the respective electrodes since the limited or minimum sparking distance is controlled by the closely adjacent central or midportions of the electrodes. The greater distances between the upper and lower edges of the multiple electrodes inhibit ionization and influence consequent concentration of the discharge at the center of the electrodes. This provides a more uniform discharge with a minimum of time lag, the sparking discharge having a sharp cut-off due to the persistence limits in the gaps and the quenching effect of the gaseous filling. The ionization of the discharge in the gaps is enhanced by the addition of radium paint 36, as shown in the stem of Fig. 6, or the paint may be applied to the wall of the vessel as described in connection with Fig. 1. In addition, corona points provided by angle-shaped rods 64 and 65 attached to the cathanode 53, which are directed toward the respective discharge paths between the multiple electrodes, readily initiate ionization in the gaps when a sparking voltage is applied to the electrodes.

Another form of the invention is illustrated in Fig. 8 in which a series of spark gaps is provided to attain greater power output while maintaining longer life in the operation of the device. In this construction each electrode is a counterpart of the other except the terminal electrode so that the assembly represents a symmetrical composition for attaining high power output with a minimum of sputtering of the electrodes. This is achieved through the limitation of sparking area, interspacial relation and electrode surface materials exposed to the gaseous discharges generated in the device.

The multiple spark gap electrode assembly comprises a plurality of similar composite disc elements 66 to 68, inclusive, and a terminal disc element 69 spaced uniformly in the vessel and mounted in parallel relation from the stem 21 of the vessel. Each electrode, as shown in Fig. 9, is formed of an aluminum disc 70 provided on one surface with a central circular recess 71, shown clearly in the terminal disc 69, Fig. 8, in which a molybdenum insert 72 is securely seated, the insert being omitted from the terminal element 69. The insert 72 forms the cathode surface of the electrode while the rear surface of the aluminum disc forms the anode surface. Since the successive cathode surfaces 72 of electrodes 66 to 68 are positioned in opposed relation to the anode surfaces of electrodes 67 to 69, inclusive, a series of spark gaps is provided to carry the higher current output generated by the device. Each electrode is uniformly spaced from the adjacent electrodes to provide the required gap distance whereby the discharge is restricted to the path between the insert surface 72 and the plain surface of the aluminum disc directly opposed thereto, the electrodes being individually mounted on a pair of stub wires in the stem which are arranged in a circular boundary, as shown in Fig. 10. Each electrode is provided with a pair of tangentially extending pins 73 which project from the lower peripheral surface for connection to supporting straps, such as 74, carried by electrode 66 and attached to a pair of stub wires 75 in the stem, one of which forms a conductor connected to a terminal 22 on the base 23. The succeeding electrodes are connected to similar pairs of straps and stub wires in the stem for mounting each electrode in rigid position in relation to an adjacent electrode. In the arrangement shown the intermediate electrodes 67 and 68 function simultaneously as cathodes and anodes in the respective gaps while the electrodes 66 and 69 function only as cathode and anode, respectively. Insulation of the multiple terminal wires in the stem may be conveniently provided by a shield member 76, of mica or similar material, having cut-out portions 71 surrounding most of the terminal wires while the shield is supported on the stem studs of electrode 67 by clips 78. A corona point rod 79 may be attached to a supporting brace of electrode 68 to direct the point thereof towards the gap between the composite electrode 68 and the terminal anode 69 whereby initial ionization is produced in this gap and the succeeding gaps simultaneously break down due to the intense ionization in the device to facilitate the handling of the high power discharge for generating the pulse signals of high frequency for which the device is adapted.

When aluminum or other easily oxidizable metal is employed as the electrode material, it is desirable to have such electrodes surrounded by an inert gas or mixture of inert gases, such as argon and helium or argon and hydrogen, whereas when highly refractory metals, such as tungsten and molybdenum, are used the gas or gaseous mixture may be any of those heretofore mentioned, it being preferable to employ a mixture of gases in view of the greatly reduced sputtering rate of the electrodes in such an environment.

While the invention has been disclosed with respect to various embodiments representing the aspects of this invention, it is, of course, understood that various modifications may be made in the detailed assembly and combination of elements as herein described without departing from the scope of the invention as defined in the appended claims.

What is claimed is:

1. An ionic discharge device comprising an enclosing vessel containing an ionizing medium at substantial pressure, multiple parallel electrodes of similar configuration mounted within said vessel and adapted to initiate a plurality of discharges in separate uniform gaps between opposed cathode and anode surfaces, and a corona point element directed toward one of said gaps and supported in relation to the discharge path to initiate conduction therein.

2. An ionic discharge device comprising an enclosing vessel containing an ionizing medium at substantial pressure, multiple cold electrodes mounted within said vessel in cooperating relation and adapted to initiate a plurality of discharges in separate uniform gaps, each gap forming a restricted discharge path between the cathode and anode surfaces of said electrodes, each cathode surface being formed of dissimilar metals in juxtaposed relation, and multiple pointed corona electrodes within said vessel directed toward the separate gaps between the respective cathode and anode surfaces.

3. An ionic discharge device comprising an enclosing vessel containing an ionizing medium at substantial pressure, multiple cold electrodes mounted within said vessel in cooperating relation and adapted to initiate a plurality of discharges in separate uniform gaps, each gap forming a restricted discharge path between the cathode and anode surfaces of said electrodes, each cathode surface being formed of metals of different surface area and composition, the metal of higher melting point being centrally located in opposition to the adjacent anode surface and defining said restricted discharge path in the gap, and a pointed metallic member disposed adjacent one of the gaps and directed in alignment therewith.

4. An ionic discharge device comprising an enclosing vessel containing an ionizing medium at substantial pressure, multiple parallel electrodes of similar configuration mounted within said vessel and adapted to initiate a plurality of discharges in separate uniform gaps between opposed cathode and anode surfaces, and a plurality of corona point elements supported by an intermediate electrode and directed toward the respective gaps between said electrodes.

5. An ionic discharge device comprising an enclosing vessel containing an ionizing medium at substantial pressure, multiple parallel electrodes of similar configuration mounted within said vessel and adapted to initiate a plurality of discharges in separate uniform gaps between opposed cathode and anode surfaces, a corona point element directed toward one of said gaps and supported in relation to the discharge path to initiate conduction therein, and a transverse shield member interposed between said electrodes and the wall of said vessel.

6. An ionic discharge device comprising an enclosing vessel containing an ionizing medium at substantial pressure, multiple parallel electrodes of similar configuration mounted within said vessel and adapted to initiate a plurality of discharges in separate uniform gaps between opposed cathode and anode surfaces, a corona point element directed toward one of said gaps and supported in relation to the discharge path to initiate conduction therein, and ionization producing material deposited on the side wall of said vessel in relation to the discharge gaps between said electrodes.

7. An ionic discharge device comprising an enclosing vessel containing a gaseous atmosphere at substantial pressure, a pair of parallel plate-like electrodes mounted in said vessel, one of said electrodes having a layer of highly refractory metal in facing relation to the other electrode, a pair of similar electrodes interposed between the first pair but in transposed relation to the adjacent electrodes of the first pair, said second pair being tied together, and a pair of corona point electrodes attached to said second pair of electrodes and extending toward the gaps between opposed dissimilar electrodes of said first and second pairs of electrodes.

8. A multiple spark gap discharge device comprising an enclosing vessel containing a gaseous mixture substantially at atmospheric pressure, a plurality of electrodes mounted therein including a cathode surface and an anode surface and similar electrode surfaces in transposed relation opposite said cathode and anode surfaces, each pair defining a restricted discharge path therebetween, and a pair of corona point members adjacent said discharge paths, each member being directed toward a path between a respective pair of electrodes.

9. A multiple spark gap discharge device comprising an enclosing vessel containing a gaseous mixture substantially at atmospheric pressure, a plurality of electrodes mounted therein including a cathode surface and an anode surface and similar electrode surfaces in transposed relation opposite said cathode and anode surfaces, each pair defining a restricted discharge path therebetween, a pair of corona point members adjacent said discharge paths, each member being directed toward a path between a respective pair of electrodes, and a metallic connection coupling said similar electrode surfaces together to function as a common cathanode element.

10. A multiple spark gap discharge device comprising an enclosing vessel containing a gaseous mixture substantially at atmospheric pressure, a plurality of parallel electrodes mounted therein including a cathode surface and an anode surface, similar intermediate electrode surfaces in transposed relation opposite said cathode and anode surfaces, each pair defining a restricted discharge path therebetween, and a pair of corona point members adjacent said discharge paths, each member being directed toward a path between a respective pair of electrodes.

11. A high frequency spark gap discharge device comprising an enclosing vessel containing a mixture of inert gases at a pressure less than atmospheric, a cathode and an anode in spaced relation within said vessel, a cathanode interposed between said cathode and anode and forming therewith a plurality of spark discharge gaps, and a pair of corona electrodes having their points directed toward said discharge gaps.

12. A high frequency spark gap discharge device according to claim 11 in which said corona electrodes are supported by said cathanode.

13. A high frequency spark gap discharge device comprising an enclosing vessel containing a mixture of inert gases at a pressure less than atmospheric, a plate-like cathode and a plate-like anode mounted in perpendicular relation to each other, a cathanode positioned between said cathode and anode and forming therewith a pair of restricted discharge gaps, and a pair of corona point elements directed upwardly in line with said gaps.

14. An ionic discharge device comprising an enclosing vessel containing a mixture of argon and oxygen at a pressure of the order of 50 to 76 centimeters of mercury, a series of composite disc electrodes therein mounted in parallel relation to provide multiple spark gaps therebetween, said electrodes having a metallic body portion with a central recess on one surface, a highly refractory metallic insert seated in said recess, said insert forming a cathode surface and the body portion forming an anode surface, the insert of one disc being disposed opposite the body portion of an adjacent disc to constitute the discharge path of the sparking energy, the distance therebetween being approximately .075 inch, a terminal electrode disc at the end of the series of electrodes, a corona point element carried by one of said composite electrodes and extending toward the adjacent gap, and a shield interposed between said electrodes and the wall of said vessel.

15. An ionic multiple spark gap discharge device comprising an enclosing vessel containing a gaseous mixture of argon and oxygen at a pressure of approximately 60 centimeters of mercury, a plurality of rectangular-shaped sheet metal electrodes mounted in parallel relation in said vessel, each electrode having a central raised portion to provide a sparking area between adjacent electrodes, said electrodes being mounted in pairs to constitute opposed cathode and anode elements for the generation of a sparking discharge in separate gaps, said cathode element of each pair having a highly refractory sheet metal layer superimposed on said raised portion and spaced from the anode raised portion a distance substantially about .075 inch, a cathode and anode element of each pair being connected together to form a combined cathanode, and hook-shaped corona point members carried by said cathanode and extending toward the respective gaps between the separate pairs of electrodes.

16. An ionic multiple spark gap discharge device comprising an enclosing vessel containing a gaseous mixture of argon and oxygen at a pressure of approximately 60 centimeters of mercury, a common cathanode having a composite cathode surface and an anode surface mounted in said vessel, an anode in opposed spaced relation to said cathode surface, a composite cathode in opposed spaced relation to said anode surface, a corona point element attached to said cathanode and extending toward the gap between one of said cathode surfaces and one of said anode surfaces, and another corona point element extending toward the gap between the other of said cathode and anode surfaces.

17. An ionic multiple spark gap discharge device comprising an enclosing vessel containing a gaseous mixture of argon and oxygen at a pressure of approximately 60 centimeters of mercury, parallel pairs of similar-shaped rectangular metallic members disposed in uniform spaced relation to constitute separate spark discharge gaps of limited extent, alternate members having a highly refractory central surface in opposition to the plane surface, the intermediate pair of members being connected together, and a pair of corona point elements supported by said intermediate pair of members and extending toward the respective gaps between said parallel pairs of members.

18. A multiple spark gap discharge device comprising an enclosing vessel having a dished stem, a mixture of 75 per cent oxygen and 25 per cent argon at a pressure of 67 centimeters of mercury in said vessel, two pairs of similar-shaped electrodes of sheet molybdenum mounted in collateral relation from said stem, said electrodes having embossed central portions defining the spark discharge path between each pair of electrodes, one electrode of each pair having a tungsten plate superimposed on its embossed portion in frontal relation to the embossed portion of the oppositely disposed electrode, a bridging connection between the intermediate pair of electrodes, and vertically mounted hook-shaped corona point rods carried by said intermediate pair of electrodes and extending downwardly over the gaps between said two pairs of electrodes.

CHARLES DEPEW.
WALLACE A. DEPP.
ALFRED N. LUCE.
JAMES R. HAYNES.

REFERENCES CITED

The following references are of record in the file of this patent:

UNITED STATES PATENTS

| Number | Name | Date |
|---|---|---|
| 548,134 | Moore | Oct. 15, 1895 |